United States Patent
Zimmerman

(10) Patent No.: US 11,835,933 B2
(45) Date of Patent: Dec. 5, 2023

(54) INDUSTRIAL AUTOMATION INTEGRATION METHOD FOR INTERNET OF THINGS TECHNOLOGIES

(71) Applicant: Grace Technologies, Inc., Davenport, IA (US)

(72) Inventor: Andrew T. Zimmerman, Bettendorf, IA (US)

(73) Assignee: GRACE TECHNOLOGIES, INC., Davenport, IA (US)

( * ) Notice: Subject to any disclaimer, the term of this patent is extended or adjusted under 35 U.S.C. 154(b) by 98 days.

(21) Appl. No.: 17/524,943

(22) Filed: Nov. 12, 2021

(65) Prior Publication Data

US 2022/0155744 A1   May 19, 2022

Related U.S. Application Data

(60) Provisional application No. 63/113,529, filed on Nov. 13, 2020.

(51) Int. Cl.
G05B 19/05   (2006.01)

(52) U.S. Cl.
CPC ...... *G05B 19/05* (2013.01); *G05B 2219/1215* (2013.01)

(58) Field of Classification Search
None
See application file for complete search history.

(56) References Cited

U.S. PATENT DOCUMENTS

| | | | |
|---|---|---|---|
| 8,387,019 B1 * | 2/2013 | Ogami | G06F 9/44505 717/124 |
| 9,477,936 B2 | 10/2016 | Lawson et al. | |
| 9,786,197 B2 | 10/2017 | Asenjo et al. | |
| 9,800,667 B2 | 10/2017 | Maturana et al. | |

(Continued)

FOREIGN PATENT DOCUMENTS

WO   WO-2015196892 A1 * 12/2015 ............. H04L 12/28

OTHER PUBLICATIONS

Grace Sense, "Predictive Maintenance System: Maximize production and profits with IIoT", 12 pages, date: N/A.

*Primary Examiner* — Mohammad Ali
*Assistant Examiner* — David Earl Ogg
(74) *Attorney, Agent, or Firm* — Goodhue, Coleman & Owens, P.C.

(57) ABSTRACT

A process for integrating an industrial automation system with an Internet of Things (IoT) system may include providing access to a cloud-based platform, the cloud-based platform having a user interface. The user interface provides for easily displaying and changing configuration parameters describing a gateway module, a data acquisition module, and a sensor data channel associated with an industrial automation system wherein the data acquisition module can collect and process data from the sensor data channel and communicate that sensor data and any related processed information to a gateway module. The gateway module may also communicate configuration information to the data acquisition module and sensor data channel. The process may use the cloud-based platform to generate a memory map of the IoT system which can be used by a PLC or similar device of the industrial automation system to configure the IoT system and display data collected from the IoT system.

22 Claims, 11 Drawing Sheets

(56) References Cited

U.S. PATENT DOCUMENTS

| | | |
|---|---|---|
| 10,261,678 B2 | 4/2019 | Roaldson et al. |
| 10,620,612 B2 | 4/2020 | Chao et al. |
| 11,086,298 B2 | 8/2021 | Chand et al. |
| 2004/0133689 A1* | 7/2004 | Vasisht ............... H04L 41/0803 |
| | | 709/228 |
| 2006/0069689 A1* | 3/2006 | Karklins ................ G05B 19/05 |
| 2016/0241646 A1* | 8/2016 | Nieminen ............... H04L 67/12 |
| 2018/0069773 A1* | 3/2018 | Verma ................... H04L 43/103 |
| 2020/0089214 A1* | 3/2020 | Cella ........................ H04Q 9/00 |
| 2020/0160622 A1* | 5/2020 | Aquila ............... G01R 31/3835 |

* cited by examiner

INDUSTRIAL AUTOMATION INTEGRATION METHOD FOR INTERNET OF THINGS TECHNOLOGIES

RELATED APPLICATIONS

This application claims priority to U.S. Provisional Patent Application No. 63/113,529, filed Nov. 13, 2020, hereby incorporated by reference in its entirety.

FIELD OF THE INVENTION

The present invention relates to seamlessly integrating cloud-based Internet of Things (IoT) technologies with industrial automation systems such as, but not limited to, programmable logic controllers (PLCs), supervisory control and data acquisition (SCADA) systems or distributed control systems (DCSs).

BACKGROUND OF THE INVENTION

The Industrial IoT Market has an enormous potential globally, and is projected to reach $11.2B by 2021 while riding a compound annual growth rate (CAGR) of 16.8%. Inside that overarching umbrella, industrial process control is expected to have a major share (36.5% or $4.1B), and North America is expected to represent the largest regional market, with a 46.3% or $5.2B cut of global revenue.

One of the main drivers for this explosive growth is the fact that today's industrial landscape relies predominantly on either route-based inspections or on other schedule-based maintenance programs to ensure that equipment is able to function 24 hours a day, 7 days a week. High productivity demands and just-in-time approaches to manufacturing mean that equipment downtime can be extremely expensive and may cost a manufacturer well over $1M per hour in lost revenue, and research shows that the average manufacturer deals with 800 hours of downtime per year. Further, an increasing quantity of aging equipment and a maintenance workforce that is largely reaching retirement age have led to a situation where the availability of qualified and trained personnel is dwindling and maintenance staffs are often lacking the knowledge, training, and/or manpower to address a growing pool of aging assets.

As such, the remote monitoring of industrial equipment is expected to be one of the most glaring trend shifts in this space. Maintenance managers are looking to track critical process equipment like motors, pumps, and drives from remote locations so as to reduce maintenance costs and improve their safety of operations. Furthermore, while some facilities do not do any maintenance on their equipment and this equipment is therefore subject to catastrophic and unpredicted failure, others overdo maintenance activities which wastes money and often increases the risk of equipment malfunction and safety hazards due to human error in each maintenance process. Thus, the introduction of IoT concepts and technology will allow maintenance teams to autonomously identify patterns and trends that can help their equipment avoid catastrophic situations.

While numerous IoT technologies have been developed and show great promise, it has been found that 74% of all IoT projects still fail to meet expectations. These project failures can have many causes, but in the industrial environment it often boils down to one of three main issues with industrial IoT technology.

First, industrial IoT solutions often solve a single problem in isolation. For example, many systems focus only on detecting and diagnosing vibration-related issues in rotating equipment (e.g. pumps, motors, fans, etc.). As a result, additional systems are required to solve other problems in an industrial facility that require different types of monitoring and analysis (e.g. issues relating to temperature, humidity, fluid levels, power quality, etc.). This forces an end user to incorporate a large variety of different user interfaces and dashboards into their maintenance processes, and can lead to both user confusion and poor adoption of these critical technologies.

Second, IoT solutions often present novel cybersecurity risks that are unacceptable in the industrial environment, where network security is a top priority. Because the current suite of IoT offerings are underpinned by a diverse array of technologies and often leverage proprietary mechanisms to communicate with the cloud, warehouse data, and present analyses, industrial IT departments are increasingly wary of working with these untested technologies that may present security vulnerabilities.

Third, IoT solutions often fail to integrate well with legacy industrial automation systems or networks. Most industrial facilities have invested tens of millions of dollars in legacy automation equipment (PLC, SCADA, DCS, etc.) over a period of decades. The presence of this legacy technology often creates conflict with IoT devices that force users and existing industrial equipment to adapt to new methods of collecting, processing, sharing, storing, and displaying new IoT-generated data and information. In the end, these integration challenges have largely prevented the widespread industrial adoption of IoT technology.

As a result of these problems with integrating IoT technology in the industrial environment, industrial IoT has yet to reach its full commercial potential. It is clear that a better integration method is needed that allows industrial automation systems to seamlessly ingest data, analysis, and/or insights from a wide variety of IoT devices. This method will need to allow for the full flexibility of an IoT system to be harnessed while exchanging data and results using existing, proven, and secure communication methods that are accessible by both new and legacy industrial automation systems.

SUMMARY OF THE INVENTION

Therefore, it is a primary object, feature, or advantage to improve over the state of the art.

It is a further object, feature, or advantage to seamlessly integrate cloud-based Internet of Things (IoT) technologies with industrial automation systems such as programmable logic controllers (PLCs), supervisory control and data acquisition (SCADA) systems or distributed control systems (DCSs).

It is a still further object, feature, or advantage to provide methods and systems which allow for IoT integration with new or legacy industrial automation systems.

It is another object, feature, or advantage a method for new or legacy industrial automation systems to seamlessly ingest data, analysis, and/or insights from a network of IoT devices without requiring the architect of the industrial automation system to understand any of the underlying complexities that enable the modularity and variability of an IoT system.

It is a further object, feature, or advantage to provide methods and systems which allow for the number of data acquisition modules present in a system to be variable throughout the life of the system.

It is a further object, feature, or advantage to provide methods and systems which allow for the number of gateway modules present in a system to be variable throughout the life of the system.

It is a still further object, feature, or advantage to provide methods and systems which allow for the number of channels of sensor data and/or processed information available to each data acquisition module(s) within a system to be variable throughout the life of the system.

Another object, feature, or advantage is to provide methods and systems which allow for the type and configuration of each channel of sensor data and/or processed information available to each of said data acquisition modules(s) to be variable throughout the life of the system.

Yet another object, feature, or advantage is to provide methods and systems which allow parent-to-child communication relationships between data acquisition module(s) and gateway module(s) to be variable throughout the life of the system.

A further object, feature, or advantage is to provide methods and systems which allow the mechanism(s) through which an industrial automation system can access sensor data and/or processed information from gateway module(s) to be created and/or maintained despite system variability.

A still further object, feature, or advantage is to provide widgets or other components as a part of a cloud-based user interface which assist users by providing simple and intuitive control over parameters for data acquisition modules or other nodes.

One or more of these and/or other objects, features, or advantages will become apparent from the disclosure that follows. It is to be understood that no single embodiment need exhibit each and every of the above objects, features, or advantages. Instead, different embodiments may have different objects, features, or advantages.

According to one aspect, a system is provided for collecting data from at least one industrial process and/or for operation with an industrial automation system, the industrial automation system configured for controlling the at least one industrial process. The system includes at least one data acquisition module configured for collecting at least one channel of sensor data and/or determining at least one piece of processed information related to at least one industrial process. The system further includes at least one gateway module configured for communicating both with the at least one data acquisition module and the industrial automation system. The system is configured such that configuration data for the at least one data acquisition module and the at least one gateway module is maintained in one or more of the at least one gateway module including configuration data for the at least one channel of sensor data and/or processed information. The system is reconfigurable to: modify a number of the at least one data acquisition modules, modify a number of channels of sensor data and/or pieces of processed information available to each of the at least one data acquisition modules, change a type and configuration of each of the at least one channel of sensor data and/or processed information, and/or change parent-to-child communication relationships between each of the at least one data acquisition module and the at least one gateway module. The at least one gateway module may be further configured for performing data acquisition. The system may be further configured to generate a system configuration and communicate the system configuration to a device within the industrial automation system and wherein the device is adapted to configure the system using the system configuration. The device may be a programmable logic controller (PLC). The at least one gateway module may include an industrial network interface for communicating over an industrial network with the industrial automation system. The system may be further configured to receive the system configuration from the industrial network interface through the at least one gateway module. The industrial network may be an EtherNet/IP network. The at least one gateway module may further include at least one of a local wired interface and a wireless interface for communicating with the at least one data acquisition module. The at least one gateway module may further include further comprises at least one of a wired network interface or a wireless network interface for communicating with a cloud-based platform. The system may further include a software application executing on at least one processor associated with the cloud-based platform, wherein the software application provides a user interface to assist a user in configuring and reconfiguring the system by generating the configuration data. The user interface may further provide for assisting the user in generating a system configuration file for communication from the industrial automation system to the at least one gateway module and from the at least one gateway module to the at least one data acquisition module. The system configuration file may be a memory map.

According to another aspect, a method for integrating an industrial automation system with Internet of Things (IoT) is provided. The method includes providing access to a cloud-based platform, the cloud-based platform having a user interface wherein the user interface provides for displaying and changing configuration parameters describing a gateway module data acquisition module, and at least one channel of sensor data associated with the industrial automation system wherein the gateway module and the data acquisition module are both configured to communicate with each other. The method further includes generating using the cloud-based platform a system configuration file for association with the industrial automation system. The method further includes communicating the system configuration file from the cloud-based platform to the industrial automation system. The system configuration file may be communicated from a PLC associated with the industrial automation system to the gateway module. The method may further include communicating system configuration parameters directly to the gateway module from the cloud-based platform. The communication may be via a wireless communication network. The wireless communication network may be selected from a set consisting of a Zigbee-compatible network and a Bluetooth network. The step of communicating between the gateway module and the industrial automation system may be performed over an industrial network. The industrial network may be an ethernet industrial protocol (EIP) network. The step of communicating between the cloud-based platform and the gateway module may be performed using at least one of a Wi-Fi network and a cellular network. The data acquisition module may provide for at least one of temperature sensing and vibration sensing.

According to another aspect, a system for integrating with an industrial automation system includes at least one data acquisition module configured to collect at least one channel of sensor data or calculating at least one piece of processed information related to at least one industrial process associated with the industrial automation system. The system further includes at least one gateway module configured to communicate both with at least one of said data acquisition module(s) and said industrial automation system. The system further includes a cloud-based platform comprising software executing on one or more processors, the cloud-based platform having a user interface wherein the user interface provides for displaying and changing configuration parameters describing the at least one gateway module and the at least one data acquisition module associated with the industrial automation system wherein the at least one gateway module and the at least one data acquisition module are both configured to communicate with each other. The cloud-based platform may be configured to generate a system configuration file used by a device inside of the industrial automation system. The gateway module may be configured to receive the system configuration file from the cloud-based platform and communicate the configuration file from the gateway module to the industrial automation system. According to another aspect of the present disclosure a system includes an industrial automation system capable of controlling at least one industrial process and/or collecting data from at least one industrial process. The system further includes at least one data acquisition module capable of collecting at least one channel of sensor data or providing at least one piece of processed information related to at least one industrial process. The system further includes at least one gateway module capable of communicating both with at least one of said data acquisition module(s) and said industrial automation system. The number of said data acquisition modules can be variable throughout the life of the system. The number of said gateway modules can be variable throughout the life of the system. The number of channels of sensor data and/or processed information available to each of said data acquisition module(s) can be variable throughout the life of the system. The type and configuration of each channel of sensor data and/or processed information available to each of said data acquisition modules(s) can be variable throughout the life of the system. The parent-to-child communication relationships between said data acquisition module(s) and said gateway module(s) can be variable throughout the life of the system. The mechanism(s) through which said industrial automation system can accesses sensor data and/or processed information from said gateway module(s) can be created and/or maintained despite system variability.

According to another aspect of the present disclosure, one or more data acquisition module(s) may regularly communicate at least one channel of either sensor data or information to one or more gateway module(s). An industrial automation system will regularly collect all sensor data and/or information from the data acquisition module(s) by communicating directly with the gateway module(s). Throughout the life of the system, the number, type, and configuration parameters for all channels, data acquisition module(s), and/or gateway module(s) may change due to the modularity of the IoT approach. In some embodiments, the industrial automation system can seamlessly perform an initial setup and then adjust to these changes without the need to write new automation or control instructions. The ability to do so may depend upon the particular PLC, SCADA or other control device or system being used.

According to yet another aspect of the present disclosure a system allows a user to define the number, type, and configuration parameters of all data acquisition module(s), data and/information channel(s), and/or gateway module(s) present in a system using a cloud-hosted user interface. These numbers, types, and configuration parameters can then be exported into a variety of file formats native to different automation platforms, and then imported into the appropriate automation platform to prevent the need for any application-specific coding. The industrial automation system can then use this imported file to know which data acquisition module(s) will make data and/or information available on which gateway module(s). The gateway module(s) can also be instructed on how to provide data and/or information from connected data acquisition module(s) to the industrial automation system through a similar import of the exported configuration file, which can be provided from the PLC or similar device to the gateway module(s) after import. Future updates of configuration parameters can be conveyed to both the gateway module(s) and the industrial automation system using this same export/import process.

According to another aspect of the present disclosure a system may simultaneously provide sensor data and/or information to an industrial automation system and a cloud-based platform (comprising a database and set of web applications).

According to another aspect, a cloud-based platform may be used to define whether the gateway module(s) should receive configurations from the cloud-based platform or from an industrial automation system.

BRIEF DESCRIPTION OF THE DRAWINGS

The drawings described herein are for illustrative purposes only of selected embodiments and not all possible implementations, and are not intended to limit the scope of the present disclosure. Note that the dimensions are not necessarily to scale.

DETAILED DESCRIPTION

The present disclosure describes systems and methods associated with industrial automation including providing for seamless integration of cloud-based Internet of Things (IoT) technologies with industrial automation systems such as, but not limited to, programmable logic controllers (PLCs), supervisory control and data acquisition (SCADA) systems or distributed control systems (DCSs).

Figure 1:
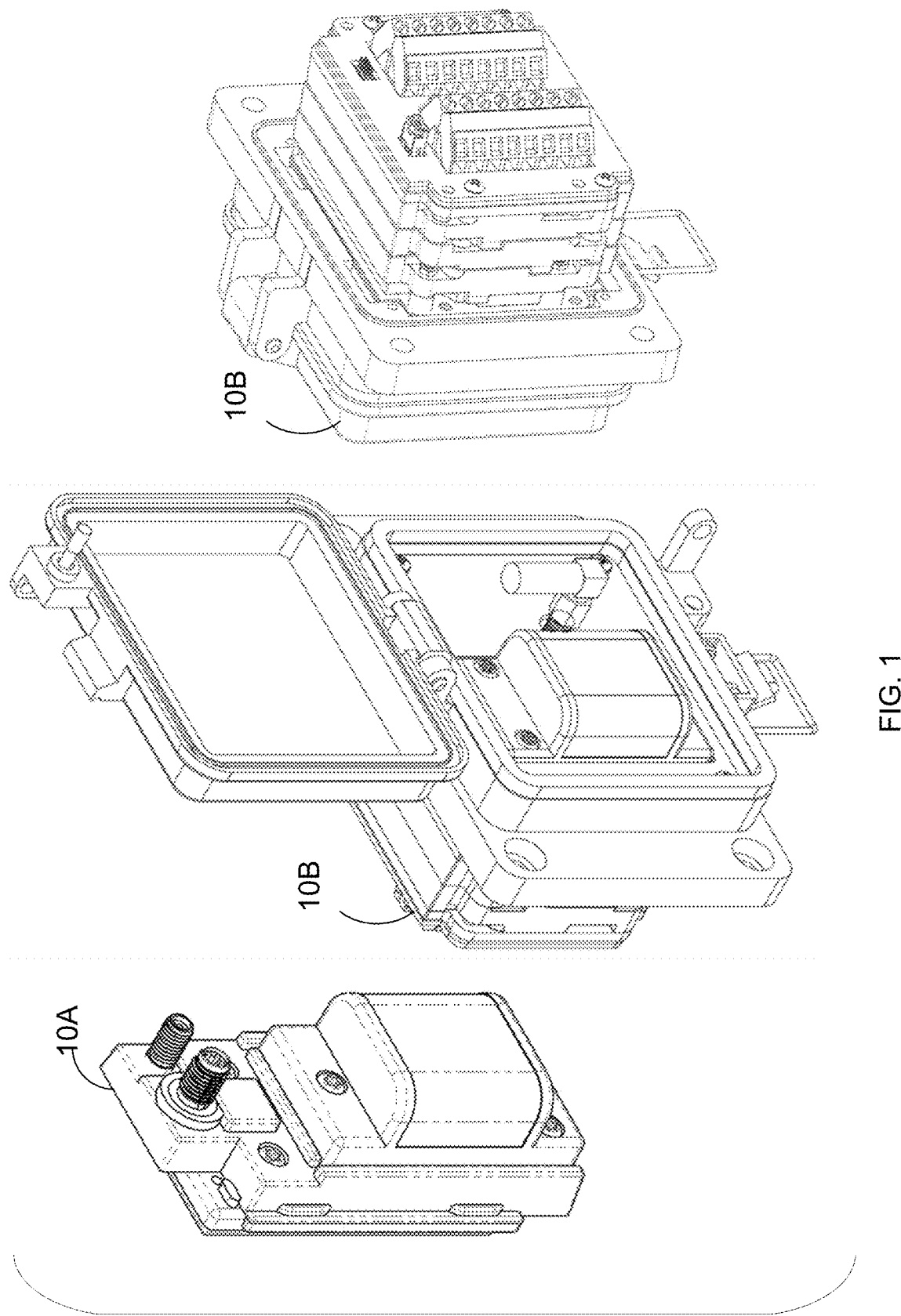
FIG. 1 shows an example of two data acquisition modules capable of collecting and processing data that is pertinent to an industrial process.

FIG. 1 illustrates two examples of data acquisition modules. Data acquisition module 10A is a wireless vibration and temperature module such as is available from Grace Technologies, Inc. (Davenport, Iowa USA). Data acquisition module 10B is an example of a wireless panel-mount data acquisition module also available from Grace Technologies, Inc. (Davenport, Iowa USA), Data acquisition module 10A may be used to detect both temperature and vibration associated with an industrial machine or system. Data acquisition module 10B may be wired to a panel such as an electrical panel so that wired sensors may be used such as 0-10 volt DC sensor inputs, 0-20 mA sensor inputs, thermistors for temperature sensing, or other types of sensor inputs which may be configured for different industrial sensor applications. Both 10A and 10B can communicate data to a gateway through a wireless interface such as, but not limited to, a Bluetooth interface, BLE, or Zigbee interface.

Figure 2:
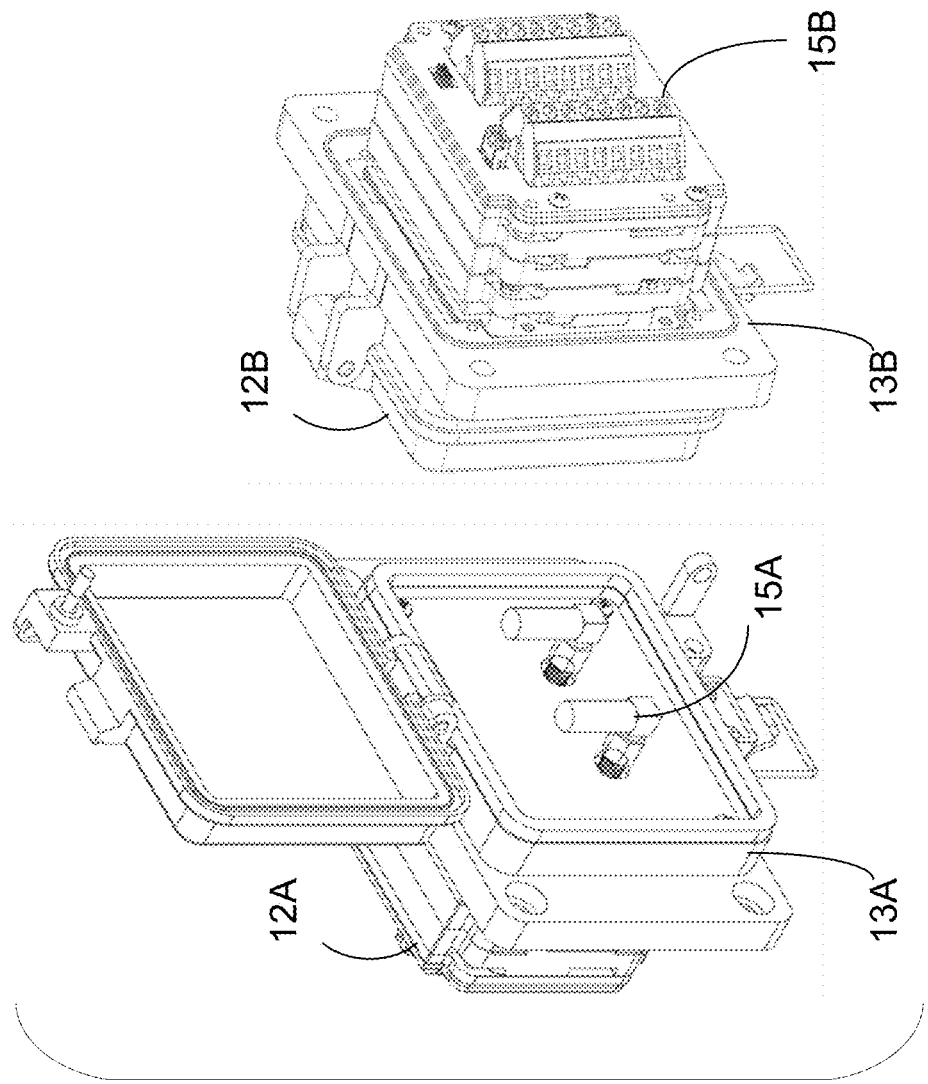
FIG. 2 shows an example of a gateway module configured for receiving data from one or more data acquisition module(s) and communicating that data both to a cloud-hosted IoT system and to one or more industrial automation system(s).

FIG. 2 illustrates two examples of gateway 12A in a housing 13A and gateway 12B in a housing 13B. One example of a gateway is the wireless panel-mount gateway (CloudGate™) available from Grace Technologies (Davenport, Iowa USA). Any data acquisition module may send data to a gateway 12A through wireless communications such as Zigbee-compatible communication, Bluetooth communication or other type of wireless communication. Gateway 12A is capable of then communicating sensor data or calculated information to both a cloud-based platform using a network interface 15A such as WiFi or LTE or an industrial automation system using an industrial network interface such as EtherNet/IP. There may be multiple gateways present on a given network, and any data acquisition module can communicate with any of them provided they are within wireless range. Furthermore, the gateway such as gateway 12B can also be an example of a data acquisition module, where in addition to communicating with a cloud-based platform and an industrial automation system, gateway 12B may also be wired to collect data from sensors such as 0-10 volt DC sensor inputs, 0-20 mA sensor inputs, thermistors for temperature sensing, or other types of sensor inputs which may be configured for different industrial sensor applications. In other words, in some embodiments, a gateway may include functionality of a data acquisition module. The gateway 12B is shown within a housing 13B configured for mounting to a panel in an industrial environment. A terminal block 15B is shown which may be stackable to accommodate different types of sensor inputs.

Figure 3A:
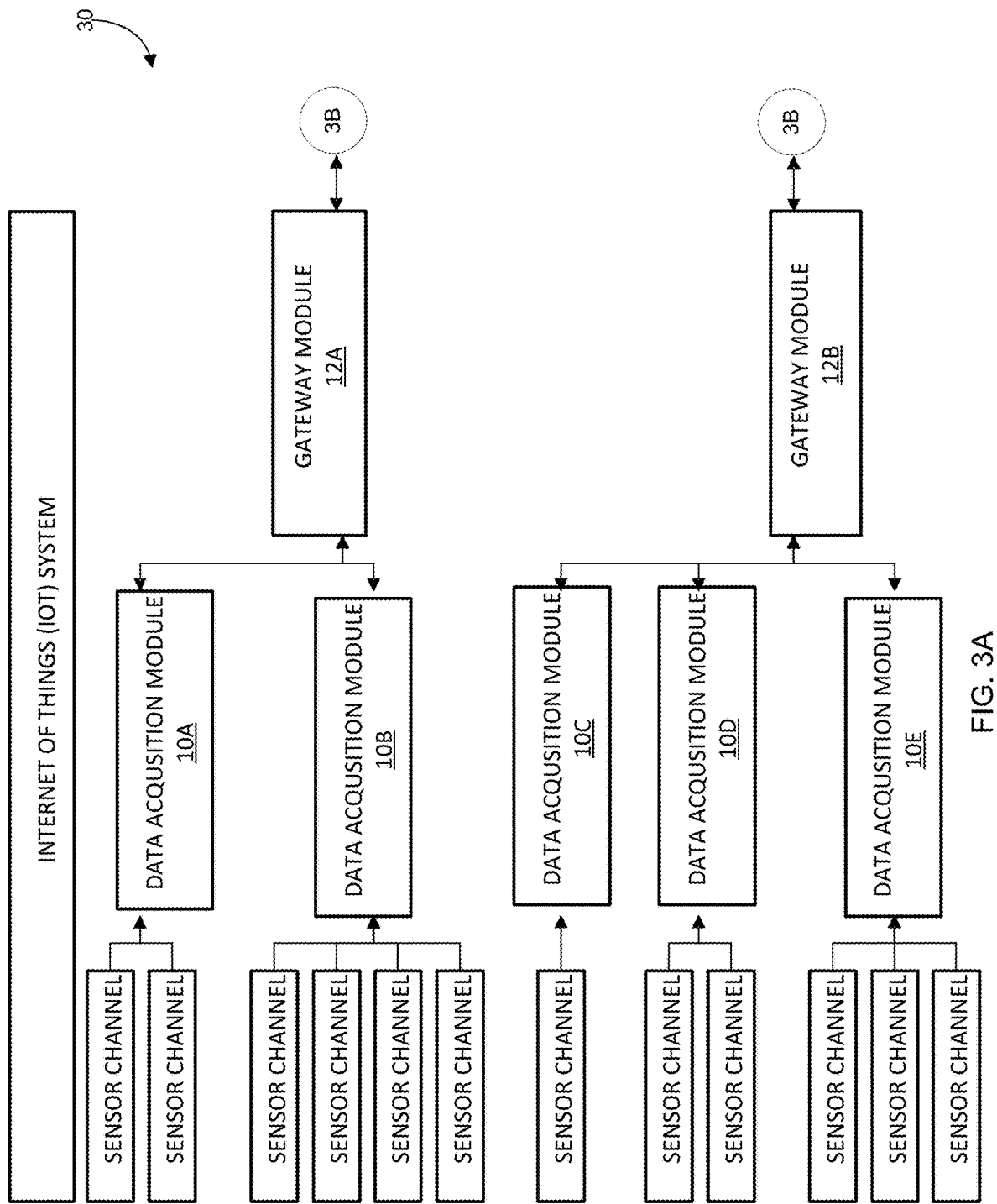
FIG. 3A and FIG. 3B show an overall view of an exemplary system.
Figure 3B:
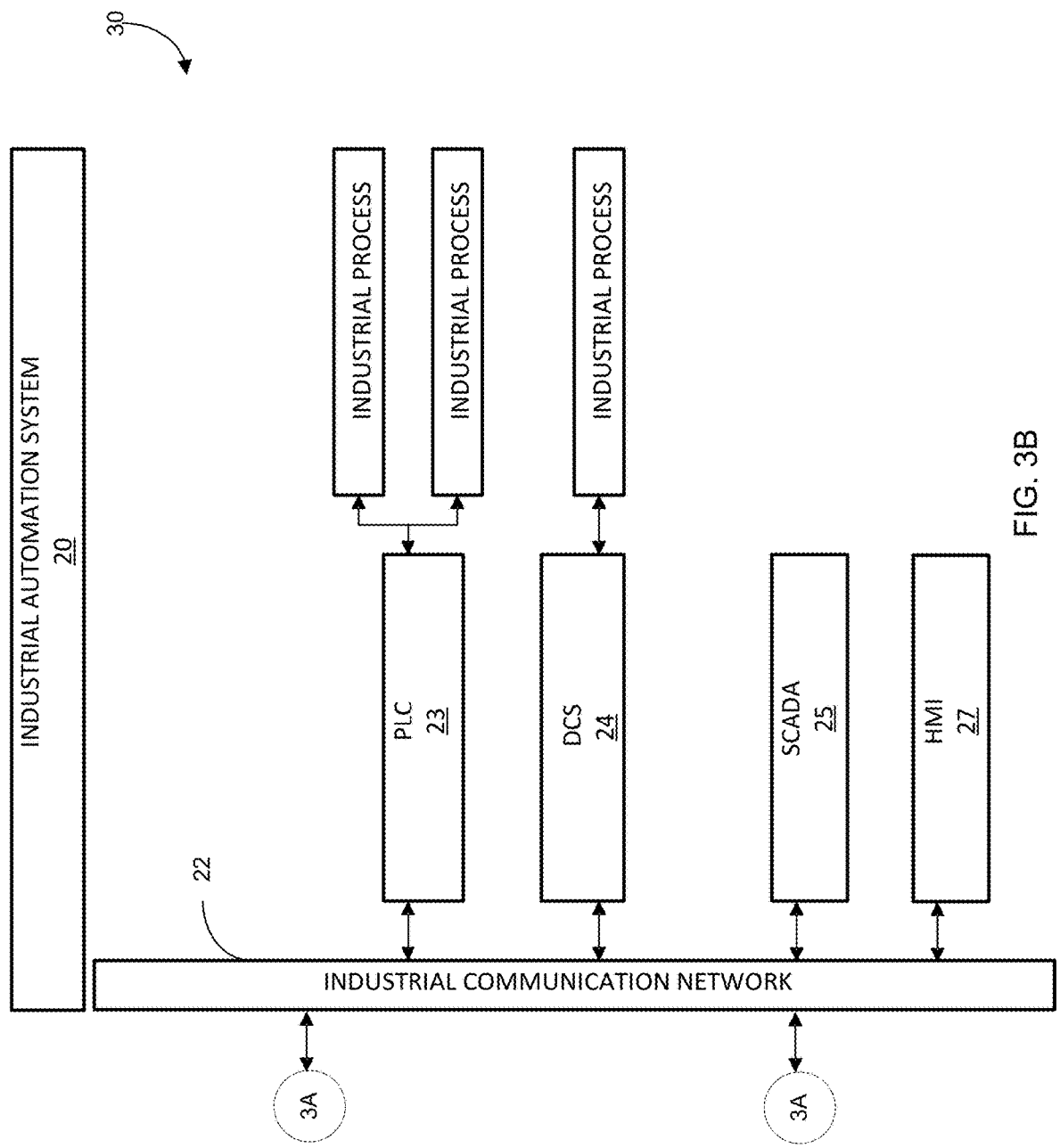

FIG. 3A and FIG. 3B illustrates one example of a system 30 which includes a first set of data acquisition modules 10A, 10B in wireless communication with a first gateway module 12A which is also in network communication with an industrial automation system 20. The gateway module 12A may be in operative communication with the industrial automation system 20 through an industrial communication network 22 such as an Ethernet/IP network although other types of industrial communication networks may be used as may be appropriate in a particular industrial application or industrial environment. Other examples of industrial networks which may be used may include, without limitation, Modbus TCP/IP, Data Highway Plus, ControlNet, or Devicenet. The industrial automation system 20 may include any number of different components such as a programmable logic controller (PLC) 23, a distributed control system (DCS) 24, a supervisor control and data acquisition (SCADA) system 25, a human machine interface (HMI) 27, and/or other components which may be a part of an industrial automation system.

A second set of data acquisition modules 10C, 10D, 10E are in wireless communication with a second gateway module 12B which is also in network communication with the industrial automation system 20. Although two sets of data acquisition modules are shown, more or fewer sets may be present and more or fewer data acquisition modules may be present in each of the sets.

Figure 4A:
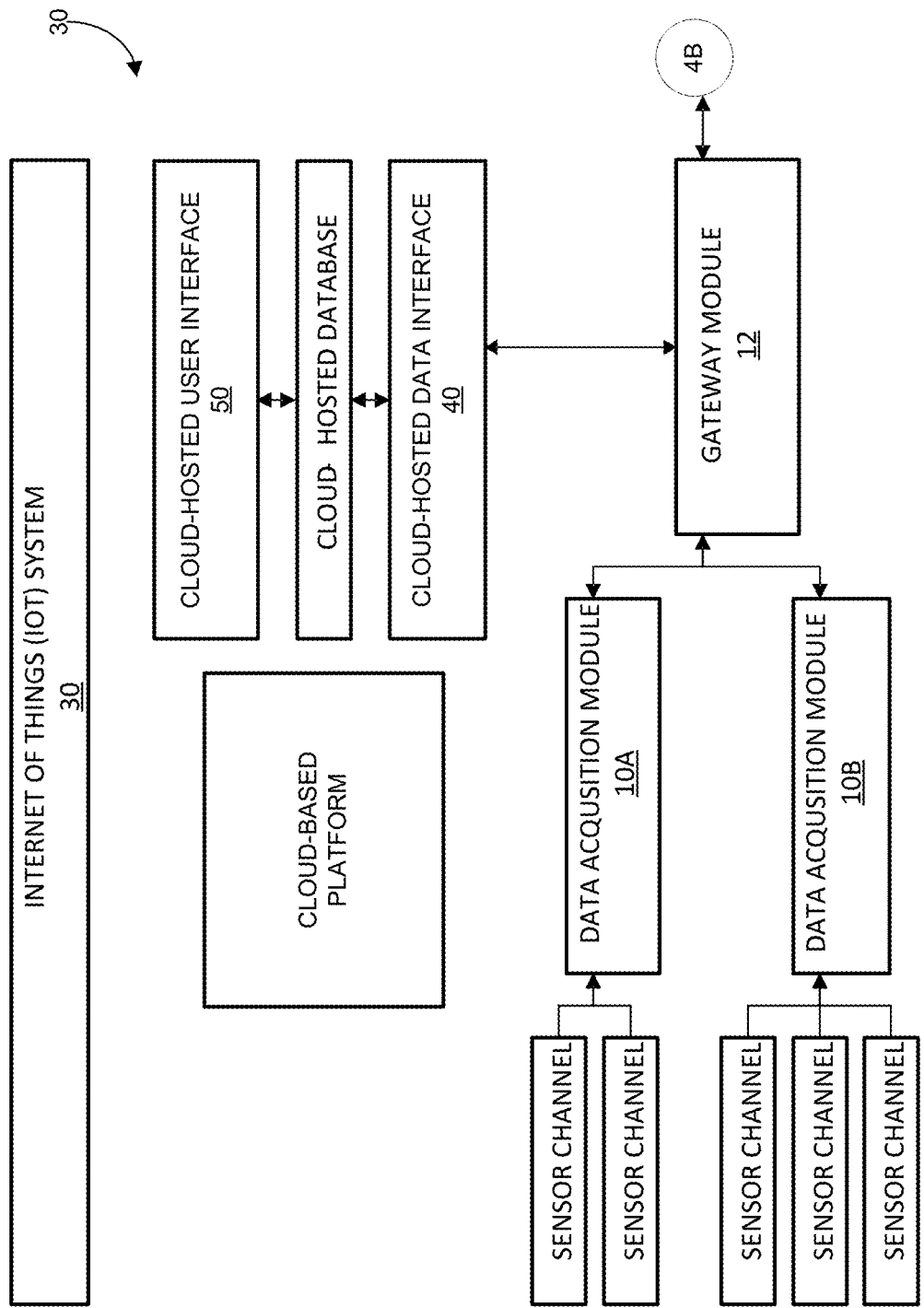
FIG. 4A and FIG. 4B show an overall view of a system simultaneously providing sensor data and/or information to an industrial automation system and a cloud-hosted IoT system.
Figure 4B:
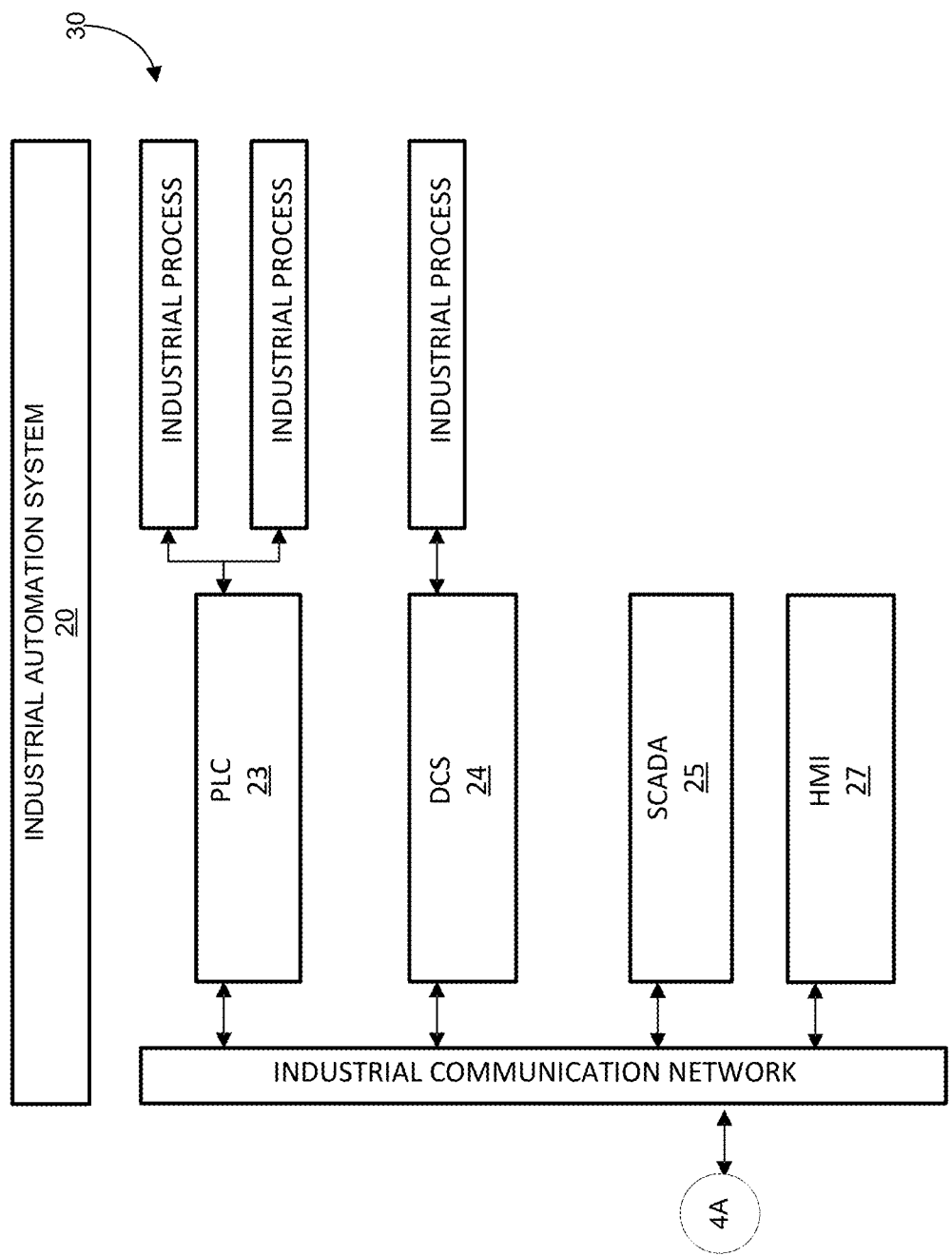

FIG. 4A and FIG. 4B illustrates the system 30 where the gateway module 12 is also in operative communication through a cloud-hosted data interface 40 with a cloud platform executing cloud-hosted software 50. It should further be understood in some embodiments where a cloud is present, the cloud may be hosted locally such as with a dedicated on-premises server or may be located in a third-party remote cloud such as Amazon AWS or Microsoft Azure. The gateway 12 may use a network interface such as a radio interface such as a Wi-Fi or cellular interface (such as LTE) for communications with the cloud-hosted data interface 40. One or more data acquisition modules 10A, 10B may regularly communicate at least one channel of either sensor data or information to one or more gateway modules 12. An industrial automation system 20 will regularly collect all sensor data and/or information from the data acquisition module(s) 10A, 10B by communicating directly with the gateway module(s) 12. Throughout the life of the system, the number, type, and configuration parameters for all channels, data acquisition module(s) 10A, 10B, and/or gateway module(s) 12 may change due to the modularity of the IoT approach. The industrial automation system 20 can seamlessly perform an initial setup and then adjust to these changes without the need to write new automation or control instructions.

It is to be understood that there may be one or more subnets present. Where there are more than one subnet present, not all gateway modules need communicate with all data acquisition modules. Similarly, not all industrial automation devices need communicate with all gateway modules.

Figure 5:
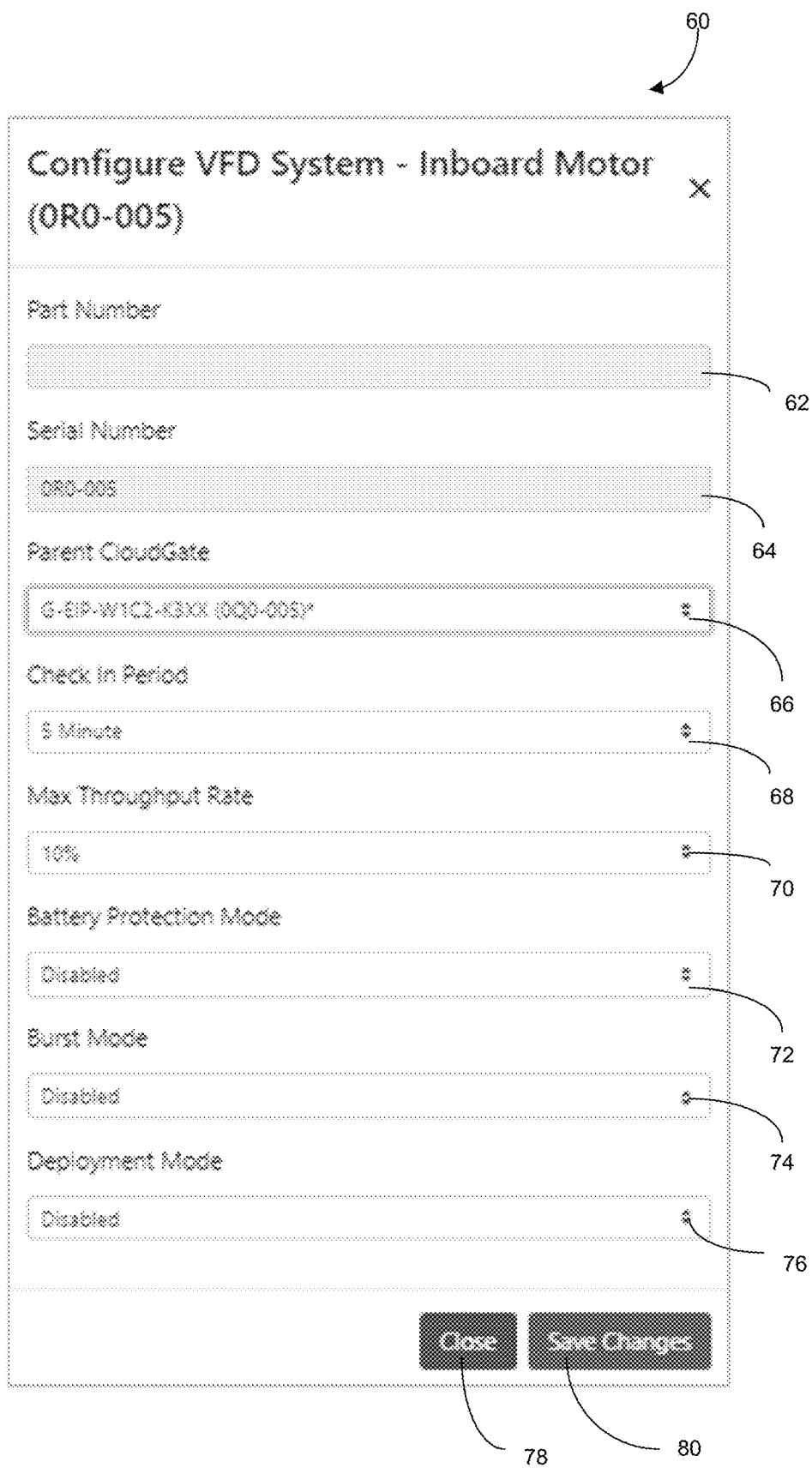
FIG. 5 shows a screen display from a cloud-hosted user interface that can be used to configure data acquisition module(s), data and/or information channel(s), and/or gateway module(s).
Figure 6:
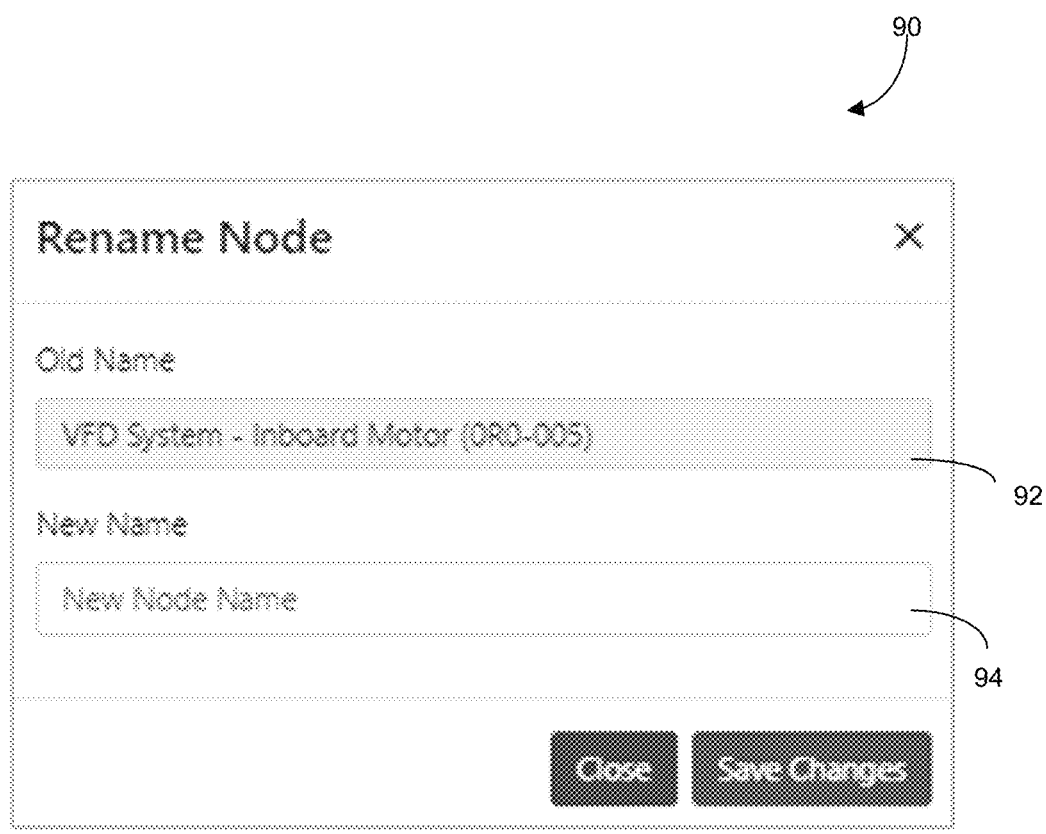
FIG. 6. is a screen display which allows for the renaming of a node.
Figure 7:
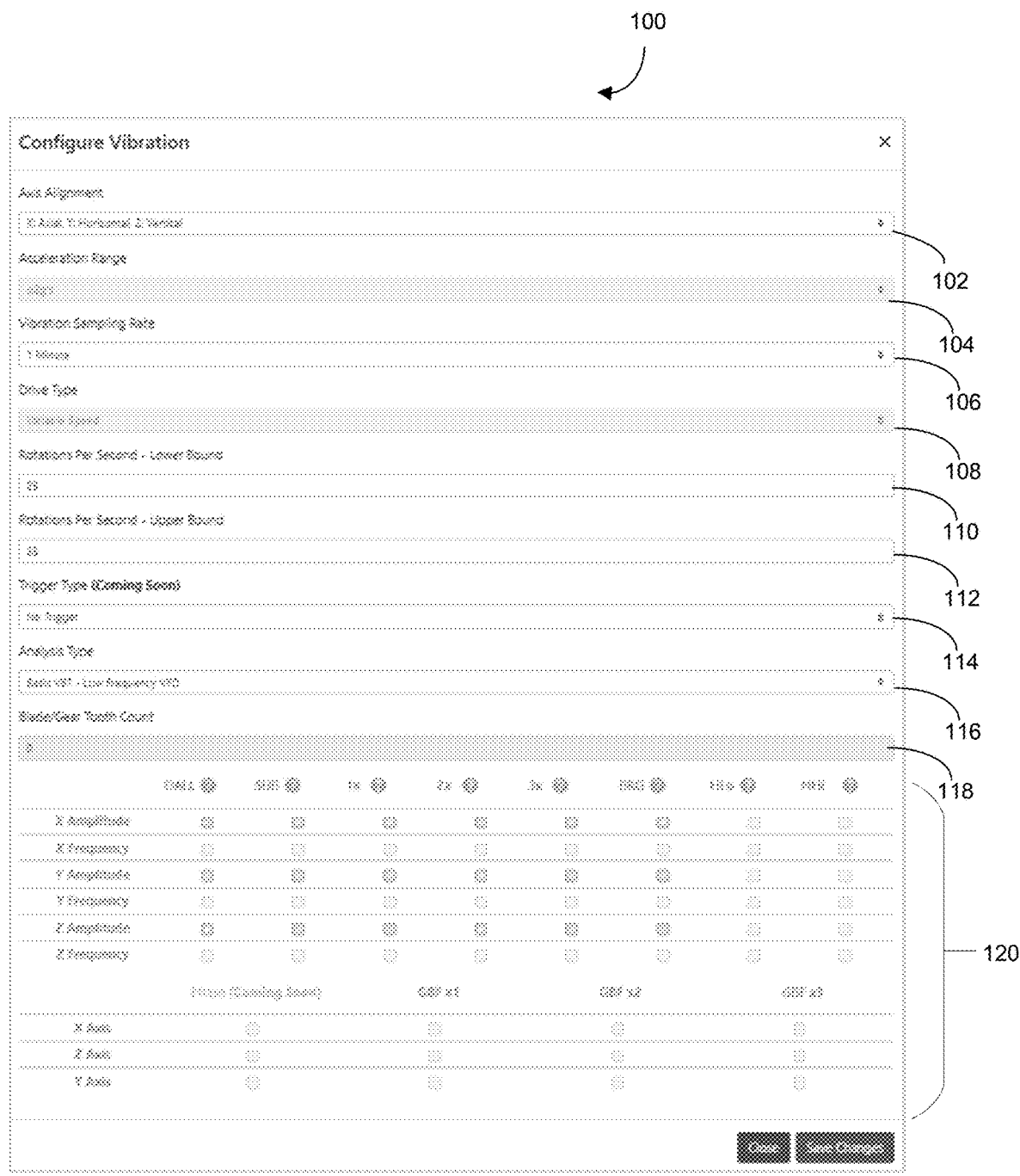
FIG. 7 is a screen display which allows for configuring a data acquisition module.

FIG. 5 through FIG. 7 illustrate several examples of screen displays from the cloud-hosted software. A user may easily, using these and similar displays, define the number, type, and configuration parameters of all data acquisition module(s), data and/or information channel(s), and/or gateway module(s) present in a system using a cloud-hosted user interface of the cloud platform. These numbers, types, and configuration parameters can then be exported into a variety of file formats native to different automation platforms, and then imported into the appropriate industrial automation platform to prevent the need for any application-specific coding. The industrial automation system can then use these imported files to know which data acquisition module(s) will make data and/or information available through which gateway module(s). The industrial automation system can also use these imported files to generate humanly understandable labels or tags to define, for example, the type and location of the data being gathered. The industrial automation system can also use these imported files to convey to the gateway module(s) how to appropriately configure themselves and their attached data acquisition module(s) to generate the desired data. The gateway module(s) may also be instructed directly on how to provide data and/or information from connected data acquisition module(s) to the industrial automation system through a similar direct import of the exported configuration file(s). Future updates of configuration parameters can be conveyed to both the gateway module(s) and the industrial automation system using this same export/import process.

In FIG. 5, a screen display 60 illustrates one example of the manner in which a data acquisition module may be configured. In a part number field 62, a part number for the module may be displayed or specified. In a serial number field 64, a serial number for the module may be displayed or specified. In a parent CloudGate field 66, a parent gateway module may be specified. In some embodiments, the parent gateway module may be selected from a list of available gateway modules. In a check-in period field 68 a user can specify how often the data acquisition module establishes a connection with a parent gateway module. This time period may be selected from a list. In a maximum throughput rate field 70, a user can specify a maximum throughput rate. The rate may be specified in various ways included as a percentage. In a battery protection mode field 72, a user can specify whether or not a battery protection mode is enabled or disabled. Where used, the battery protection mode, battery life of the data acquisition module may be extended. In a burst mode field 74, a user can specify whether or not a burst mode is enabled or disabled. In a deployment mode field 76, a user can specify whether or not a deployment mode is enabled or disabled. A user can also select a close button 78 to close the configuration window for the data acquisition module. A user can also select a save changes button 80 to save any changes made in the configuration of the data acquisition module.

In FIG. 6 a screen display 90 is shown which allows a user to rename a node. An old name field 92 is shown and a new name field 94 is shown. Thus, the name of a node (e.g. module) may be changed.

In FIG. 7 a screen display 100 is shown which allows a user to configure functionality of a module, in this instance configuring vibration associated with a data acquisition module. An axis alignment field 102 is shown which allows a user to select an alignment such as from a dropdown list. An acceleration range field 104 is shown which allows a user to see or change an acceleration range. A vibration sampling rate field 106 allows a user to select a desired vibration sampling rate. A drive type field 108 allows a user to view or select a drive type. A rotations per second-lower bound field 110 allows a user to select a number of rotations per second for a lower bound while a rotations per second-upper bound field 112 allows a user to select a number of rotations per second for an upper bound. A trigger type field 114 allows a user to select whether a trigger is present and if so, a type of trigger. An analysis type field 116 allows a user to select a type of vibration analysis performed such as from a drop down list. A blade/gear tooth count field 118 allows a user to select a blade/gear tooth count. In addition, amplitude, frequency, and phase for the different axes may be using a collection of settings 120.

It should be apparent that data shown in the screen display 100 is in a human readable form that is intuitive for a user. Thus an user can rapidly view or modify configuration parameters in a meaningful manner and this information may then be communicated to and imported into the appropriate industrial automation platform without the user needing to perform any application-specific coding.

In some embodiments, sensor data and/or information is simultaneously provided to both an industrial automation system and a cloud-based platform (comprising a database and set of one or more web applications).

In some embodiments, the cloud-based platform may be used to define whether the gateway module(s) should receive configurations from the cloud-based platform or from the industrial automation system.

Figure 8:
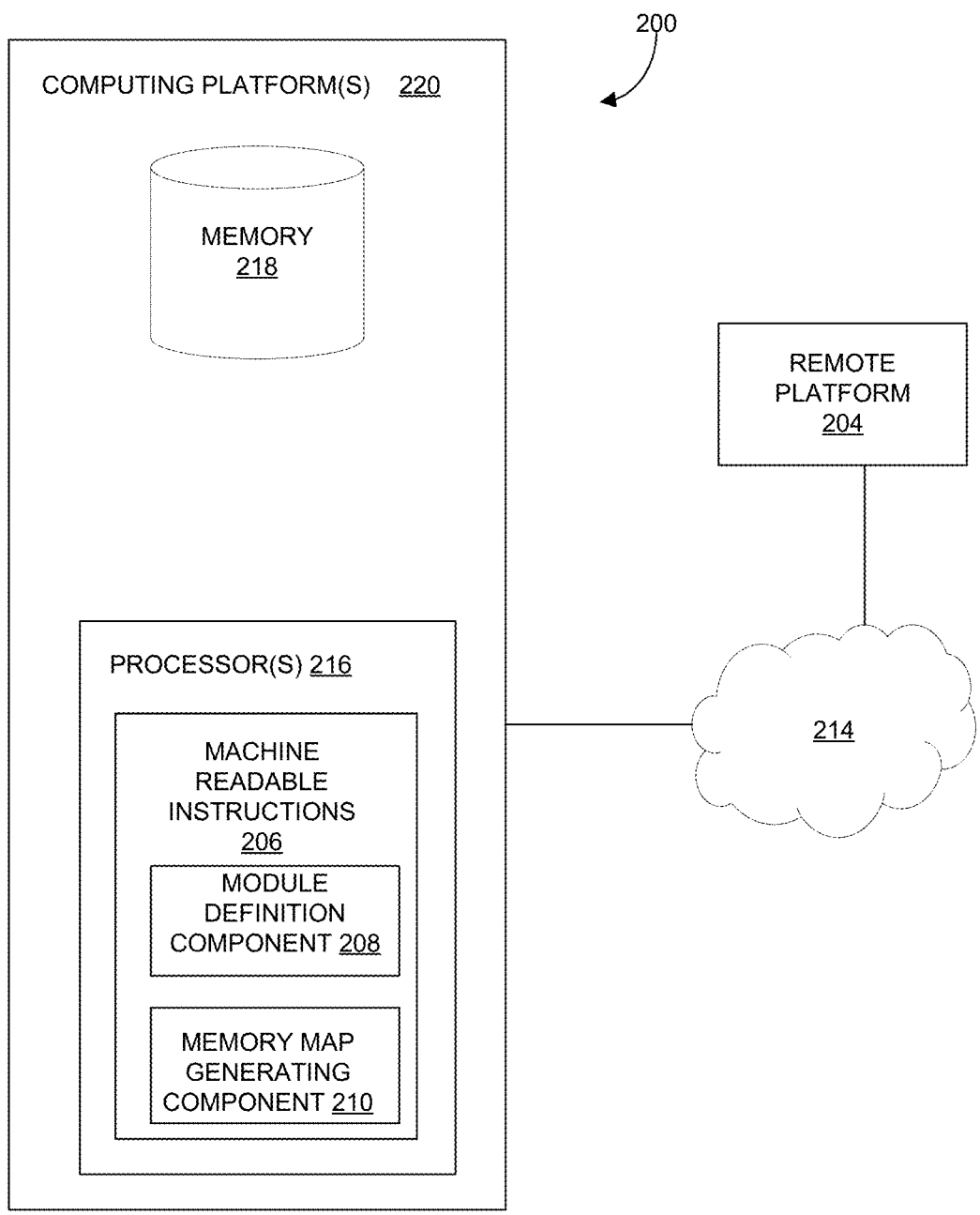
FIG. 8 illustrates a system which may be used to provide a cloud-hosted platform.

FIG. 8 illustrates a system associated with a cloud-based platform configured for integrating Internet of Things (IoT) devices with an industrial automation system, in accordance with one or more embodiments. In some cases, system 200 may include one or more computing platforms 220. The one or more remote computing platforms 220 may be communicably coupled with one or more remote platforms 204. In some cases, users may access the system 200 via remote platform(s) 204.

The one or more computing platforms 220 may be configured by machine-readable instructions 206. Machine-readable instructions 206 may include modules or components. The modules may be implemented as one or more of functional logic, hardware logic, electronic circuitry, software modules, and the like. The modules or components may include one or more of module definition component 208 and a memory map generating component 210, and/or other modules to provide functionality described herein.

The module definition component 208 may be configured to provide access to a cloud-based platform, the cloud-based platform having a user interface. The user interface provides for displaying and changing configuration parameters describing or defining a gateway module, a data acquisition module, and a sensor data channel associated with an industrial automation system wherein the gateway module and the data acquisition module are both configured to communicate with each other. More than one gateway module may be present and more than one data acquisition module may be present and more than one subnet may be present. The generating module 210 may be configured to generate using the cloud-based platform a memory map of the gateway and its attached data acquisition modules that could be used by a PLC or similar device associated with the industrial automation system.

In some cases, the one or more computing platforms 220, may be communicatively coupled to the remote platform(s) 204. In some cases, the communicative coupling may include communicative coupling through a networked environment 214. The networked environment 214 may be a radio access network, such as LTE or 5G, a local area network (LAN), a local or on-premises cloud network, a wide area network (WAN) such as the Internet, or wireless LAN (WLAN), for example. It will be appreciated that this is not intended to be limiting, and that the scope of this disclosure includes implementations in which one or more computing platforms 220 and remote platform(s) 204 may be operatively linked via some other communication coupling. The one or more one or more computing platforms 220 may be configured to communicate with the networked environment 214 via wireless or wired connections. In an embodiment, system 200 may also include one or more hosts or servers, such as the one or more remote platforms 204 connected to the networked environment 214 through wireless or wired connections. According to certain embodiments, remote platforms 204 may be standalone servers, networked servers, or an array of servers.

The one or more computing platforms 220 may include one or more processors 216 for processing information and executing instructions or operations. One or more processors 216 may be any type of general or specific purpose processor. In some cases, multiple processors 216 may be utilized according to other embodiments. In fact, the one or more processors 216 may include one or more of general-purpose computers, special purpose computers, microprocessors, and processors based on a multi-core processor architecture, as examples. In some cases, the one or more processors 216 may be remote from the one or more computing platforms 220, such as disposed within a remote platform like the one or more remote platforms 216.

The one or more computing platforms 220 may further include or be coupled to a memory 218 (internal or external), which may be coupled to one or more processors 216, for storing information and instructions that may be executed by one or more processors 216. Memory 218 may be one or more memories and of any type suitable to the local application environment, and may be implemented using any suitable volatile or nonvolatile data storage technology such as a semiconductor-based memory device, a magnetic memory device, or other type of non-transitory machine or computer readable media. The instructions stored in memory 218 may include program instructions or computer program code that, when executed by one or more processors 216, enable the one or more computing platforms 220 to perform tasks as described herein.

Figure 9:
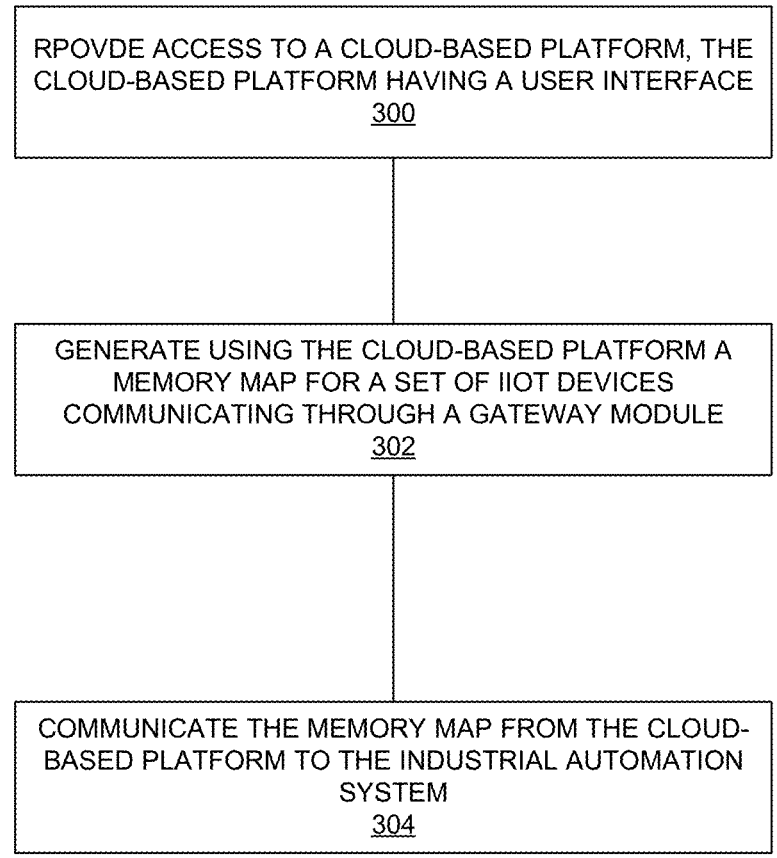
FIG. 9 illustrates one example of a method.

FIG. 9 illustrates an example flow diagram of a method, according to one embodiment. The method may include providing access to a cloud-based platform, the cloud-based platform having a user interface at block 300, the user interface provides for easily displaying and changing configuration parameters describing a gateway module, a data acquisition module, and a sensor data channel associated with an industrial automation system wherein the gateway module and the data acquisition module are both configured to communicate with each other. The method may include generating using the cloud-based platform a memory map of the gateway, its attached data acquisition modules, and any attached sensor data channels for a PLC or other similar device associated with the industrial automation system at block 302. The method may include communicating the memory map from the cloud-based platform to the industrial automation system at block 304.

In some cases, the method may be performed in part by one or more hardware processors, such as the processors 216 of FIG. 8, configured by machine-readable instructions, such as the machine readable instructions 206 of FIG. 8. In this aspect, the method may be configured to be implemented in part by the components, such as the components 208 and/or 210 discussed above with respect to FIG. 8.

According to another aspect, one or more widgets or other software applications or components may be provided through the cloud-based platform to assist in managing settings or variables associated with an industrial automation system and/or its environment. For example, in an industrial environment RF noise is prevalent. Because RF noise is prevalent, a node such as a data acquisition module may have to re-try communications several times to ensure that a data packet arrives safely at a gateway. This uses more battery life. In some applications or environments, the battery life for the node may be more important than receiving timely data. The widget allows for a user to prioritize the battery life in a simple and intuitive manner by using a slider bar which is visually displayed using the cloud-based platform. In response to a user making an adjustment using the slider bar and/or confirming an adjustment made using the slide bar, settings in the data acquisition modules may be changed.

Other types of widgets or software applications or components may also be used to provide control over the data acquisition modules, gateway modules, or industrial automation systems.

Although different aspects, examples, or embodiments have been described, it is to be understood that any number of combinations of structures, components, features, or functions may be formed. Such combinations are fully contemplated by the present disclosure.

The methods described herein or aspects thereof may be incorporated into software in the form of instructions stored on a non-transitory computer or machine readable medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments may be described herein as implementing mathematical methodologies including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Where the term "processor" is used, it is to be understood that it encompasses one or more processors whether located together or remote from one other.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a hospital, clinic, or medical office environment), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a hospital, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary or context requires otherwise, "or" refers to an inclusive or and not to an exclusive or. For example, a condition A or B is satisfied by any one of the following: A is true (or present) and B is false (or not present), A is false (or not present) and B is true (or present), and both A and B are true (or present). This may also be represented with the term "and/or".

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function or "step for [perform]ing [a function] . . . ", it is intended that such elements are to be interpreted under 35 U.S.C. 112§ (f). However, for any claims containing elements designated in any other manner, it is intended that such elements are not to be interpreted under 35 U.S.C. § 112(f).

The invention is not to be limited to the particular embodiments described herein. In particular, the invention contemplates numerous variations in segmentation. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

Therefore, methods and systems for integration of industrial automation systems and IoT systems have been shown and described throughout. Although specific examples are provided, the numerous options, variations, and alternatives are contemplated. This includes variations in the type of industrial automation system, the type of network used by the industrial automation system, the specific data acquisition modules used, the gateways used, the sensors and sensor channels, and the manner in which the nodes on a network are described. The present invention is not to be limited to the specific examples provided herein.

What is claimed is:

1. A system for collecting data from at least one industrial process and/or for operation with an industrial automation system, the industrial automation system configured for controlling the at least one industrial process, the system comprising:
    at least one data acquisition module configured for collecting at least one channel of sensor data and/or determining at least one piece of processed information related to at least one industrial process; and
    at least one gateway module configured for communicating both with the at least one data acquisition module and the industrial automation system; and
    a cloud-based platform comprising software executing on one or more processors, the cloud-based platform having a user interface wherein the user interface provides for displaying and changing configuration parameters describing the at least one gateway module and the at least one data acquisition module associated with the industrial automation system wherein the at least one gateway module and the at least one data acquisition module are both configured to communicate with each other;
    wherein the cloud-based platform is configured to generate a system configuration file used by a device inside of the industrial automation system;
    wherein the system is configured such that configuration data for the at least one data acquisition module and the at least one gateway module is maintained in one or more of the at least one gateway module including configuration data for the at least one channel of sensor data and/or processed information and wherein the system is reconfigurable to: modify a number of the at least one data acquisition modules, modify a number of channels of sensor data and/or pieces of processed information available to each of the at least one data acquisition modules, change a type and configuration of each of the at least one channel of sensor data and/or processed information, and/or change parent-to-child communication relationships between each of the at least one data acquisition module and the at least one gateway module.

2. The system of claim 1 wherein the at least one gateway module is further configured for performing data acquisition.

3. The system of claim 1 wherein the system is further configured to communicate the system configuration file to the device within the industrial automation system and wherein the device is adapted to configure the system using the system configuration file.

4. The system of claim 3 wherein the device is a programmable logic controller (PLC).

5. The system of claim 3 wherein the at least one gateway module comprises an industrial network interface for communicating over an industrial network with the industrial automation system.

6. The system of claim 5 wherein the system is further configured to receive the system configuration from the industrial network interface through the at least one gateway module.

7. The system of claim 5 wherein the industrial network is an EtherNet/IP network.

8. The system of claim 5 wherein the at least one gateway module further comprises at least one of a local wired interface and a wireless interface for communicating with the at least one data acquisition module.

9. The system of claim 8 wherein the at least one gateway module further comprises a wireless network interface for communicating with the cloud-based platform.

10. The system of claim 9 the system configuration file comprises the configuration data.

11. The system of claim 8 wherein the user interface further provides for assisting the user in generating a system configuration file for communication from the industrial automation system to the at least one gateway module and from the at least one gateway module to the at least one data acquisition module.

12. The system of claim 11 wherein the system configuration file is a memory map.

13. A method for integrating an industrial automation system with Internet of Things (IoT), the method comprising:
    providing access to a cloud-based platform, the cloud-based platform having a user interface wherein the user interface provides for displaying and changing configuration parameters describing a gateway module and a data acquisition module, and at least one channel of sensor data associated with the industrial automation system wherein the gateway module and the data acquisition module are both configured to communicate with each other;

generating using the cloud-based platform a system configuration file for association with the industrial automation system; and communicating the system configuration file from the cloud-based platform to the industrial automation system.

14. The method of claim 13 wherein the system configuration file is communicated from a PLC associated with the industrial automation system to the gateway module.

15. The method of claim 13 further comprising communicating system configuration parameters directly to the gateway module from the cloud-based platform.

16. The method of claim 13 wherein the communication is via a wireless communication network.

17. The method of claim 16 wherein the wireless communication network is selected from a set consisting of a Zigbee-compatible network and a Bluetooth network.

18. The method of claim 13 wherein the communicating between the gateway module and the industrial automation system is performed over an industrial network.

19. The method of claim 18 wherein the industrial network is an ethernet industrial protocol (EIP) network.

20. The method of claim 13 wherein the communicating between the cloud-based platform and the gateway module is performed using at least one of a Wi-Fi network and a cellular network.

21. The method of claim 13 wherein the data acquisition module provides for at least one of temperature sensing and vibration sensing.

22. A system for integrating with an industrial automation system, the system comprising:

at least one data acquisition module configured to collect at least one channel of sensor data or calculating at least one piece of processed information related to at least one industrial process associated with the industrial automation system;

a system configuration file stored on a machine-readable memory;

at least one gateway module configured to communicate both with at least one of said data acquisition module(s) and said industrial automation system; and a cloud-based platform comprising software executing on one or more processors, the cloud-based platform having a user interface wherein the user interface provides for displaying and changing configuration parameters describing the at least one gateway module and the at least one data acquisition module associated with the industrial automation system wherein the at least one gateway module and the at least one data acquisition module are both configured to communicate with each other;

wherein the cloud-based platform is configured to generate the system configuration file used by a device inside of the industrial automation system;

wherein the gateway module is configured to receive the system configuration file from the cloud-based platform and communicate the configuration file from the gateway module to the industrial automation system.

* * * * *